Patented Nov. 5, 1940

2,220,099

UNITED STATES PATENT OFFICE 2,220,099

SULPHONIC ACIDS

Fritz Guenther, Heidelberg, Hans Haussmann, Mannheim, and Walter Frank, Ludwigshafen-on-the-Rhine, Germany, assignors, by mesne assignments, to General Aniline & Film Corporation, New York, N. Y., a corporation of Delaware No Drawing. Original application January 10, 1934, Serial No. 706,042. Divided and this application September 24, 1937, Serial No. 165,486. In Germany January 14, 1933

11 Claims. (Cl. 260—505)

This application is a divisional application of the application Ser. No. 706,042, filed on January 10th, 1934, which relates to sulphonic acids valuable as wetting, cleansing, dispersing, softening and like agents and a process of producing said sulphonic acids.

The present application relates to sulphonic acids obtainable from hydrocarbons of the benzene series and halogenated mineral oils and a process of producing said sulphonic acids.

We have found that sulphonic acids very valuable as wetting, cleansing, dispersing, softening and like agents can be obtained by causing a halogenated mineral oil fraction to react with a hydrocarbon of the benzene series in the presence of a condensing agent and acting on the material with a sulphonating agent at a time not before the interaction of the said aliphatic compound and the said aromatic hydrocarbon. By the said process compounds are obtained which correspond to the general formula

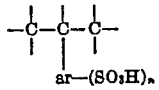

wherein ar stands for a hydrocarbon radicle of the benzene series, wherein the three carbon atoms shown form part of an aliphatic hydrocarbon radicle and wherein $n$ is a whole number above zero. Usually only one sulphonic acid group is introduced by the action of the sulphonating agent described above.

The halogenated mineral oil fraction when condensed with hydrocarbons of the benzene series in the presence of condensing agents split off hydrogen halide and therefore act as olefines.

The halogenated mineral oil fractions may be prepared according to any known manner. Suitable hydrocarbon mixtures are such from any sources, the lower limit of the boiling range of the said hydrocarbons being 100° C., such as mineral oils, for example petroleum or brown coal tar oils, or fractions thereof. Suitable fractions are for example those boiling between 150° and 300° C., 180° and 280° C., 180° and 230° C., and 150° and 250° C. The halogenation of these hydrocarbons is effected at ordinary or elevated temperature, the action of light, halogenation catalysts such as antimony pentachloride, phosphorus pentachloride, ferric chloride or iodine, and the like often having a promoting effect on the reaction. Generally speaking it is advantageous so to regulate the amount of halogen employed that for each molecular proportion of hydrocarbon there is 1 molecular proportion of halogen or less, the non-halogenated portion of hydrocarbon serving as a diluent in the subsequent condensation. In many cases it is advantageous to mix the mineral oils and hydrocarbons of the benzene series to be employed as initial materials before the halogenation, the aliphatic fraction alone or both the aliphatic and aromatic fractions being halogenated depending on the working conditions. Naturally occurring hydrocarbon mixtures containing both components, as for example certain mineral oils which contain not only hydrocarbons rich in hydrogen and of high boiling point, in particular paraffinic hydrocarbons, but also hydrocarbons of the benzene series, may also be employed as initial materials.

Aromatic hydrocarbons very suitable for the present invention are for example benzene itself, toluene, xylene, cumene and the like. The said hydrocarbons may be used in pure form or in mixture with one another or in the form of products containing them, as for example so-called Edeleanu extracts, i. e. mixtures containing aliphatic and aromatic hydrocarbons resulting from refining crude petroleum by means of liquefied sulphur dioxide.

The condensation of the halogenated mineral oils with the hydrocarbons of the benzene series is effected under the conditions usual in the Friedel-Crafts' reaction. As catalysts may be mentioned for example those effective in the Friedel-Crafts' reaction, such as aluminum chloride, iron chloride, and zinc chloride, amounts of catalyst which are but a fraction of the stoichiometrical amounts frequently being sufficient. Other condensing catalysts, namely surface active substances, as for example tonsil or bleaching earths, may also be employed. Generally speaking the condensation is carried out in the liquid phase. Solvents inert to aluminum chloride, such as benzine fractions, ligroin, carbon sulphide, or preferably the hydrocarbons of the benzene series used for the condensation may be used, especially if solid initial materials are to react. An excess of the aromatic hydrocarbon may be used as a diluent. The condensation may be effected at ordinary temperature or in the warmth.

In condensing the halogenated mineral oils with hydrocarbons of the benzene series halogen hydride is split off whereby the halogen is practically removed.

The products obtained in the said manner may be further worked up directly or after previous separation of uncondensed parts still present. After removing the catalyst, the condensation product may be purified if necessary by distillation or by decanting off the small amounts of dark colored grease. The unconverted constituents may be directly employed again together with fresh initial material.

The treatment with sulphonating agents may be effected with concentrated sulphuric acid, fuming sulphuric acid, chlorosulphonic acid, sulphuric anhydride or mixtures thereof, and, if desired, additions known to favor the sulphonation, as for example agents combining with water such as acetic anhydride, glacial acetic acid, phosphorus pentoxide or inert solvents such as carbon tetrachloride may be employed. The temperature to be used may vary within wide limits, for example between 0° and 100° C., according to the strength of the sulphonating agents and the character of the material to be sulphonated. Generally speaking comparatively mild conditions are sufficient to produce entirely water-soluble products; thus, for example, the sulphonation may be carried out by means of sulphuric acid monohydrate without the employment of sulphuric anhydride or of other agents combining with water. Usually only one sulphonic acid group is introduced into the molecule of the products. In some cases it may be of advantage to introduce a further sulpho group, for example if a product of still higher solubility than a monosulphonic acid is desired. The sulphonation products are worked up in the usual manner by diluting with water, whereby two layers are formed, the upper layer being neutralized and dried.

The products obtainable according to this invention have a high wetting, washing, dispersing and levelling power and their aqueous solutions are not precipitated by the constituents of hard water such as calcium and magnesium salts, nor by acids or alkalies. They are good wetting agents not only in the cold but also in warm baths. By reason of their excellent washing power, they are eminently suitable as washing agents for domestic and industrial purposes. They may be advantageously employed as softening agents for textiles. The products may be employed as free acids or in the form of their salts with organic or inorganic bases, as for example ammonia, potassium or sodium or methyl or ethyl amine, pyridine, piperidine or the like, either alone or in admixture with other additional substances usually employed for the production of wetting and like agents, such as soaps, Turkey red oils, true sulphonic acids or sulphuric esters of organic compounds, glue, inorganic or organic salts or perborates.

The following examples will further illustrate the nature of this invention but the invention is not restricted to these examples. The parts are by weight.

Example 1

350 parts of illuminating petroleum having a boiling range of from 150° to 300° C. is chlorinated by leading in 70 parts of chlorine at from 70° to 120° C. 385 parts of a mixture containing chlorination products is obtained which is stirred into a solution of 15 parts of aluminum chloride in 350 parts of benzene at 50° C. Condensation of the two products, with evolution of gaseous hydrochloric acid, thus takes place. In order to complete the conversion, the mixture is allowed to stand for an hour at the same temperature while stirring. Small amounts of dark viscous grease is formed from which the mobile reaction product may be readily separated by decantation. The pale mobile reaction mixture is then washed with water and the benzene and non-condensed petroleum are distilled off. The residue consists of 113 parts of a mobile pale orange condensation product which is sulphonated by introduction into 100 parts of oleum (23 per cent SO₃ content) at from 40° to 50° C. When the reaction is completed, an equal amount of water is added. Two layers are formed the lower of which is withdrawn and the upper neutralized with aqueous caustic soda solution. After drying, 230 parts of a pale sulphonation product are obtained which dissolves in water to give an entirely clear solution and which has a high washing and emulsifying power in addition to a very good wetting power in cold and hot treatment liquids.

Example 2

335 parts of mineral oil boiling between 180° and 280° C. are chlorinated at between 60° and 130° C. by introducing 100 parts of chlorine. The mixture (385 parts) is added to a suspension of 10 parts of aluminum chloride in 350 parts of xylene at between 25° and 35° C. while stirring. Condensation of the chlorinated products with the aromatic hydrocarbon occurs with the splitting off of gaseous hydrochloric acid. In order to complete the reaction the mixture is still stirred for one hour at 50° C. The thinly liquid reaction mixture is freed from a small amount of dark highly viscous by-product and unconverted xylene and mineral oil are removed by distillation. As distilling residue 290 parts of a slightly orange colored condensation product is obtained. The latter is sulphonated by introduction into 290 parts of sulphuric acid monohydrate at between 35° and 45° C. As soon as the sulphonation is completed the reaction mixture is diluted with an equal amount of water whereby two layers are formed. The upper one is separated from the lower one and neutralized by means of caustic soda solution. By working up in the usual manner 420 parts of a slightly colored sulphonation product is obtained which is clearly soluble in water and possesses a very good wetting power in cold and warm baths and a good washing and emulsifying power.

What we claim is:

1. Mixtures of a plurality of sulphonic acids each of which corresponds to the general formula

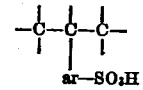

wherein ar stands for a hydrocarbon radicle of the benzene series and wherein the three carbon atoms shown form part of the radicle of a liquid saturated non-aromatic mineral oil hydrocarbon, said mixtures being obtained by chlorinating a mineral oil, causing the chlorinated product to react with a hydrocarbon of the benzene series and acting on the material with a sulphonating agent.

2. Mixtures of a plurality of sulphonic acids each of which corresponds to the general formula

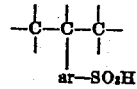

wherein ar stands for a hydrocarbon radicle of the benzene series and wherein the three carbon atoms shown form part of the radicle of a saturated non-aromatic mineral oil hydrocarbon fraction boiling above 100° C., said mixtures being obtained by chlorinating a mineral oil fraction boiling above 100° C., causing the chlorinated product to react with a hydrocarbon of the benzene series and acting on the material with a sulphonating agent.

3. Mixtures of a plurality of sulphonic acids each of which corresponds to the general formula

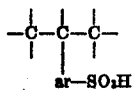

wherein ar stands for a hydrocarbon radicle of the benzene series and wherein the three carbon atoms shown form part of the radicle of a saturated non-aromatic illuminating petroleum hydrocarbon fraction boiling between 150° C. and 300° C., said mixtures being obtained by chlorinating an illuminating petroleum fraction boiling between 150° C. and 300° C., causing the chlorinated product to react with a hydrocarbon of the benzene series and acting on the material with a sulphonating agent.

4. Mixtures of a plurality of sulphonic acids each of which corresponds to the general formula

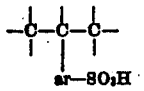

wherein ar stands for a hydrocarbon radicle of the benzene series and wherein the three carbon atoms shown form part of the radicle of a saturated non-aromatic mineral oil hydrocarbon fraction boiling between 180° and 280° C., said mixtures being obtained by chlorinating a mineral oil fraction boiling between 180° C. and 280° C., causing the chlorinated product to react with a hydrocarbon of the benzene series and acting on the material with a sulphonating agent.

5. The process of producing sulphonic acids which comprises chlorinating a mineral oil boiling above 100° C., causing the chlorinated product to react with a hydrocarbon of the benzene series in the presence of a condensing agent and acting on the material with a sulphonating agent.

6. The process of producing sulphonic acids which comprises chlorinating a mineral oil fraction boiling between 150° and 300° C., causing the chlorinated product to react with a hydrocarbon of the benzene series in the presence of a condensing agent and acting on the material with a sulphonating agent.

7. Mixtures of a plurality of sulphonic acids each of which corresponds to the general formula

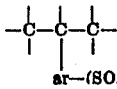

wherein ar stands for an aromatic hydrocarbon radicle of the benzene series and wherein the three carbon atoms shown form part of the radicle of a liquid saturated non-aromatic mineral oil hydrocarbon fraction and wherein $n$ is a whole number above zero, said mixtures being obtained by chlorinating a mineral oil fraction, causing the chlorinated product to react with a hydrocarbon of the benzene series and acting on the material with a sulphonating agent.

8. The mixtures as defined in claim 1 wherein the three carbon atoms of the formula form part of the radicle of a liquid saturated non-aromatic mineral oil hydrocarbon fraction.

9. The mixtures as defined in claim 1 wherein the three carbon atoms of the formula form part of the radicle of a liquid saturated non-aromatic mineral oil hydrocarbon fraction boiling between 180° and 230° C.

10. The process as defined in claim 5 wherein the mineral oil fraction boils between 180° and 280° C.

11. The process as defined in claim 5 wherein the mineral oil fraction boils between 180° and 230° C.

FRITZ GUENTHER.
HANS HAUSSMANN.
WALTER FRANK.